United States Patent [19]

Ramella

[11] Patent Number: 4,741,088

[45] Date of Patent: May 3, 1988

[54] METHOD OF MAKING A DELIVERY HEAD FOR CONTAINERS OF SUBSTANCES TO BE NEBULIZED HAVING A BREAK-UP PLASTIC INSERT INTEGRALLY FORMED WITH THE HEAD

[75] Inventor: Luca Ramella, Milan, Italy

[73] Assignee: Somova S.p.A., Buccinasco, Italy

[21] Appl. No.: 75,517

[22] Filed: Jul. 20, 1987

Related U.S. Application Data

[62] Division of Ser. No. 765,388, Aug. 13, 1985, abandoned.

[30] Foreign Application Priority Data

Mar. 21, 1985 [IT] Italy ................................ 2000 A/85

[51] Int. Cl.[4] .......................................... B23P 11/02
[52] U.S. Cl. ........................................ 29/450; 29/525; 264/295; 264/318; 264/334; 425/443
[58] Field of Search ............. 29/235, 450, 451, 527.1, 29/446, 525; 234/333, 337; 264/249, 295, 318, 334, 336, 339; 425/443, 517

[56] References Cited

U.S. PATENT DOCUMENTS

| | | | |
|---|---|---|---|
| 3,013,308 | 12/1961 | Armour | 29/451 |
| 4,153,203 | 5/1979 | Tada | 239/333 |
| 4,209,485 | 6/1980 | Greenspan | 264/318 X |
| 4,340,352 | 7/1982 | Hayberg | 425/517 |
| 4,350,298 | 9/1982 | Tada | 239/333 |

FOREIGN PATENT DOCUMENTS 114541 9/1980 Japan ................................ 264/334

Primary Examiner—P. W. Echols
Assistant Examiner—Andrew E. Rawlins
Attorney, Agent, or Firm—Dallett Hoopes

[57] ABSTRACT

The delivery head for containers of substances to be nebulized, such as aerosol containers, pump containers and the like is provided with a plastic break-up insert integrally formed therewith through a strip and the break-up insert is intended to be positioned at the outlet opening of the delivery passage provided in the delivery head and fixed therein during the stripping step from the mold so as to have as end product a delivery head already provided with the break-up insert in place. Herein also a method of making such a delivery head is contemplated.

3 Claims, 2 Drawing Sheets

METHOD OF MAKING A DELIVERY HEAD FOR CONTAINERS OF SUBSTANCES TO BE NEBULIZED HAVING A BREAK-UP PLASTIC INSERT INTEGRALLY FORMED WITH THE HEAD This application is a division of application Ser. No. 765,388, filed Aug. 13, 1985, now abandoned.

BACKGROUND OF THE INVENTION

1. Field of the Invention

This invention generally relates to delivery heads for containers of substances to be nebulized or sprayed, such as aerosol containers, pumping containers and the like and, more particularly, to a new and improved delivery head of the above mentioned kind.

2. Description of the Prior Art

It is known that from a so-called aerosol container or also a non-pressurized container a spray is generated by acting on the valve actuator (in the case of aerosols) or on the pump actuator in the case of containers provided with a pump) and this spray can be nebulized at the opening of the outlet passage of the delivery head when a break-up insert made of metal or plastic is placed in this opening, which has just the purpose to act as a restriction in order to cause a pressure drop and therefore a greater fluid rate, by letting the fluid flow to pass through suitable turbolence generating passages so as to nebulize it. Therefore, the fluid flows out of the break-up insert in the form of a nebulized spray in more or less small droplets and this depending on the number of the flow passages, the turbolence generating passage cross-sections and the pressure upstream the break-up insert.

Without this break-up insert, the nebulization can be obtained, in the case of aerosol containers, by increasing the inner pressure of the container only, (which has the disadvantage of generating a very stiff spray), whereas in the case of containers provided with a pump the nebulization cannot be obtained. The technology for making such break-up inserts and their correct positioning at the opening of the outlet passage of the delivery head have reached very sophisticated levels because, as already said, the break-up insert must permit a very accurate control of the fluid flow rate.

In the case of break-up plastic inserts, their manufacturing is carried out separately from the delivery heads and, once the inserts have been produced, they are positioned at the outlet opening of the delivery heads later, by means of specific automatic machines which have to exhibit a high production rate and an extreme precision in the assembly step.

SUMMARY OF THE INVENTION

This invention aims to obviate all these drawbacks pertaining to the prior art by providing a new and novel delivery head for pressurized or not pressurized containers, as well as a method of producing them.

To facilitate the description, the term "delivery head" is intended to include all the delivery actuators of aerosol containers, including the spray dispensers, caps embodying valve actuators and the like, as well as delivery heads for containers dispensing the fluid contained therein by means of a pump.

More particularly, the delivery head for containers of substances to be nebulized comprises, according to this invention, a break-up insert integrally connected to the head through a strip, said break-up insert being able to be positioned in the outlet opening of the delivery passage provided in said head and to be secured therein during the stripping step from the mold so as to have as end product a delivery head already provided with the break-up insert.

The method of producing a delivery head of the above mentioned kind comprises the steps of:

forming during the injection molding operation a break-up plastic insert integrally connected to said delivery head through a strip, by means of a mold insert.

stripping the so molded head from the mold so that the strip provided with said break-up insert will carry out first a rotation movement about its attachment point to said delivery head, this rotation movement being caused by said mold insert until the break-up insert will be located in front of the outlet opening of the delivery passage and then will be secured therein by said mold insert or by the mold outlet when said delivery head is stripped from the mold.

DESCRIPTION OF THE PREFERRED EMBODIMENTS

Figure 1:
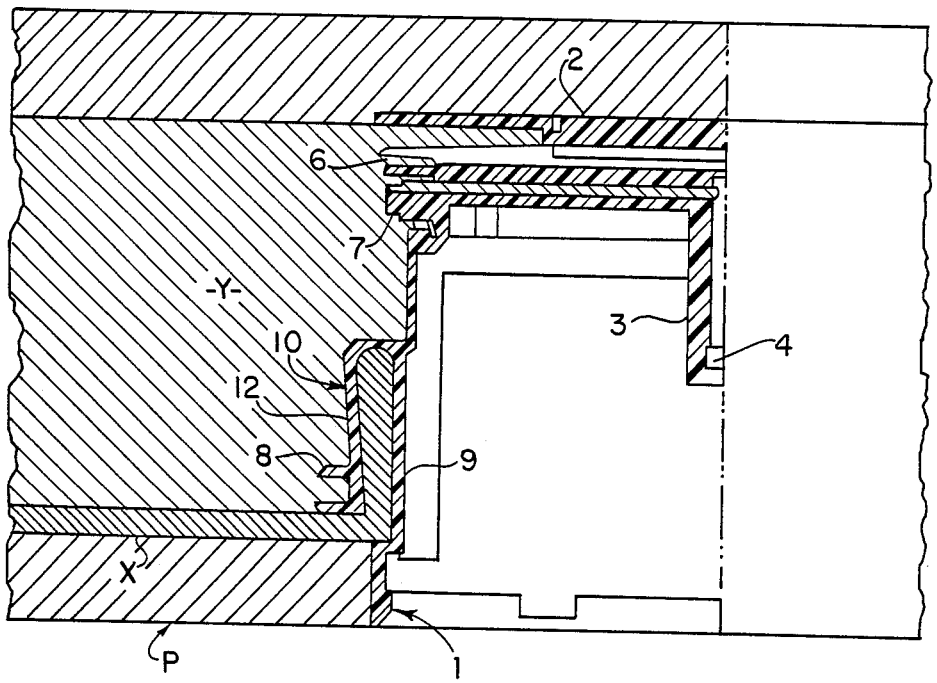
FIG. 1 is a cross-sectional view taken through an aerosol container cap provided with an actuating lever, at the time that the injection step of the molding operation has been carried out.
Figure 2:
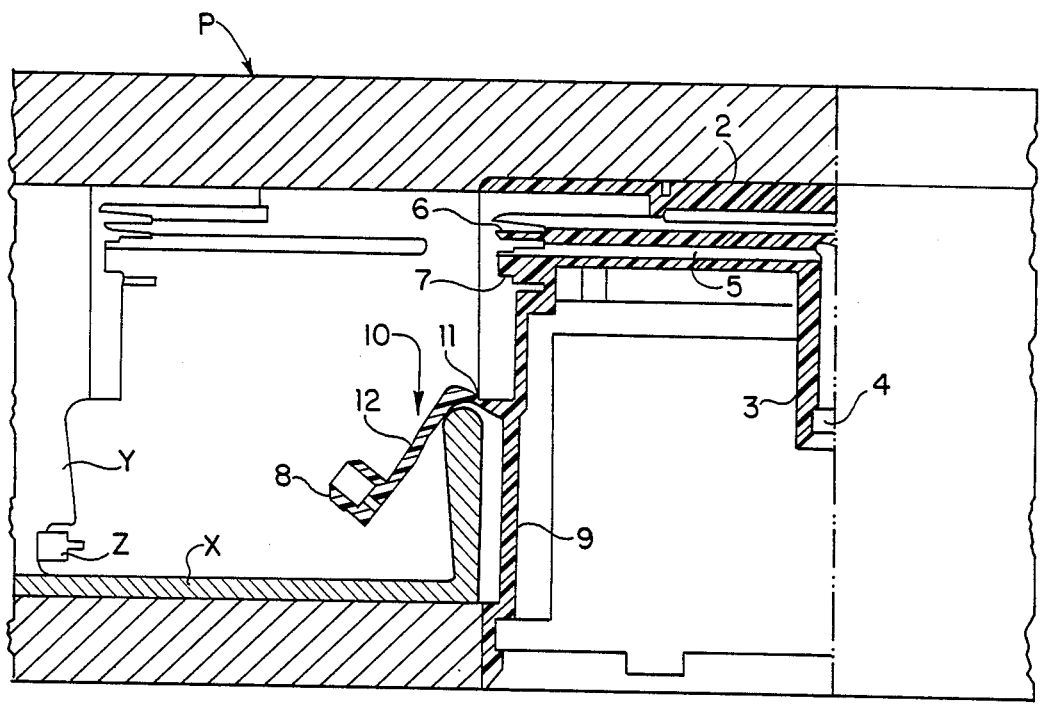
FIG. 2 is a cross-sectional view taken through the cap of FIG. 1, at the beginning of the stripping step from the mold.
Figure 3:
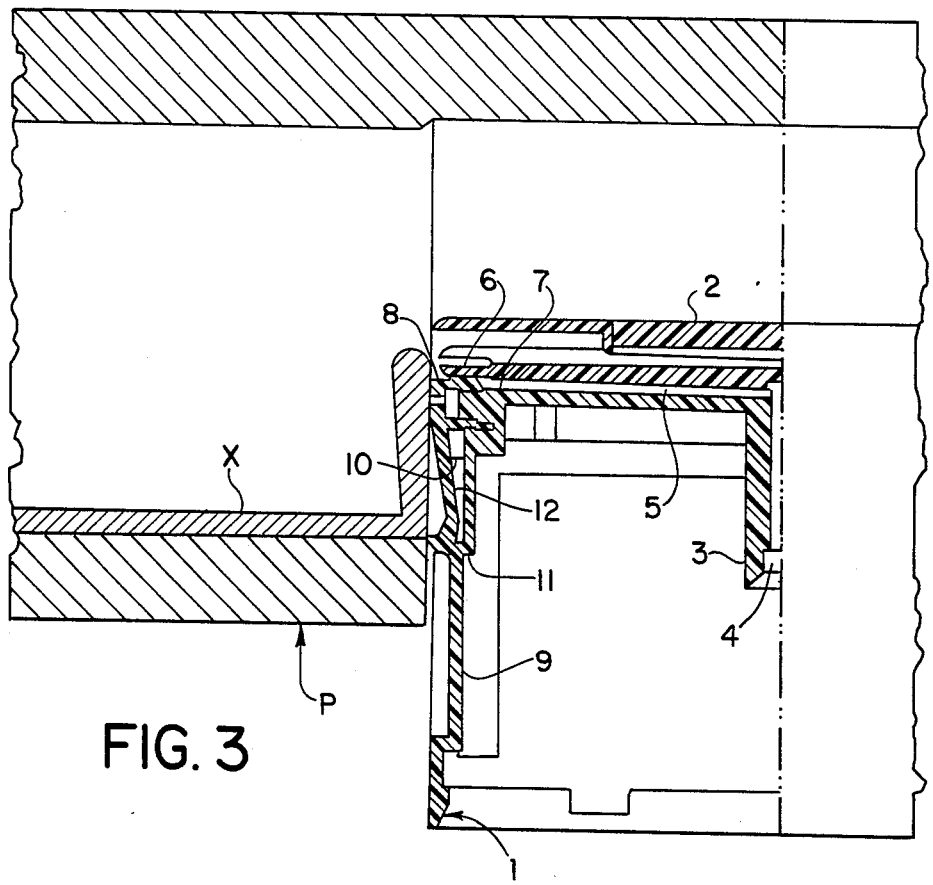
FIG. 3 is a cross-sectional view taken through the cap of FIG. 1, at the end of the stripping step from the mold.

As can be seen from the drawings, the cap 1 provided with the delivery actuator 2 illustrated therein is intended to be applied on a conventional aerosol container (not shown). The actuator 2 comprises a center body 3 provided with a vertical passage 4 and a horizontal passage 5 communicating with the vertical passage 4 at one end thereof and opening in the atmosphere at the other end thereof so as to form a delivery outlet 6. The vertical passage 4 is intended to be applied on the projecting stem of a conventional aerosol valve (not shown) so that the fluid contained therein can flow, when the valve is open, from the horizontal passage 5. In the outlet 6 of the horizontal passage 5 an abutment surface 7 if formed, which is intended to receive the break-up plastic insert 8. As shown in FIG. 1, illustrating the injection molding step of cap and actuator assembly 1,2 in which the molded delivery head is still in the mold P, only the outer portions of which are shown for sake of clarity, the break-up insert 8 is integrally molded with the cap 1 by means of the L-shaped mold insert or fence X of the conventional mold portion Y intended to mold the outlet 6 of the horizontal passage 5 as well as the abutment surface 7 and carrying in this case the die for molding the break-up insert 8, designated by Z. Therefore, the break-up insert 8 integrally attached to the side wall 9 of cap 1 through a thin strip 10 and particularly in a position beneath the delivery outlet 6 in axial alignment therewith. The attachment strip 10 as molded is formed of a very thin arcuate portion 11 bent over by about 90° and a straight portion 12 extending parallel to the cap axis, spaced from the side wall 9 of cap a distance corresponding to the thickness of the L-shaped mold insert X. Once the cap 1 with the break-up insert 8 attached thereto through the thin strip 10 has been molded, the mold portion Y is retracted and the stripping step of the so formed delivery head is begun, after the mold insert X has been slightly retracted from the side wall 9 of cap 1. As can be seen from FIG. 2, during the stripping step from the mold P the cap 1 still anchored on the mold punch or male die begins to move downwards so that the mold insert X, which remains stationary, will cause the strip 10 to rotate clockwise about the fulcrum formed by the attachment point to the side wall 9 of cap 1 until the break-up insert 8 is placed in front of the outlet 6 of the delivery passage 5. At this point, as can be seen from FIG. 3, as the stripping of cap 1 from the mold continues, the mold insert X presses the break-up insert into the outlet opening 6 so that the insert is placed on the abutment surface 7 which causes the break-up insert 8 to assume the correct position of nebulization. Then, the cap so provided with the break-up insert integrally molded therewith gets out of the mold, is released from the punch or male die and is stored for the future use.

Figure 4:
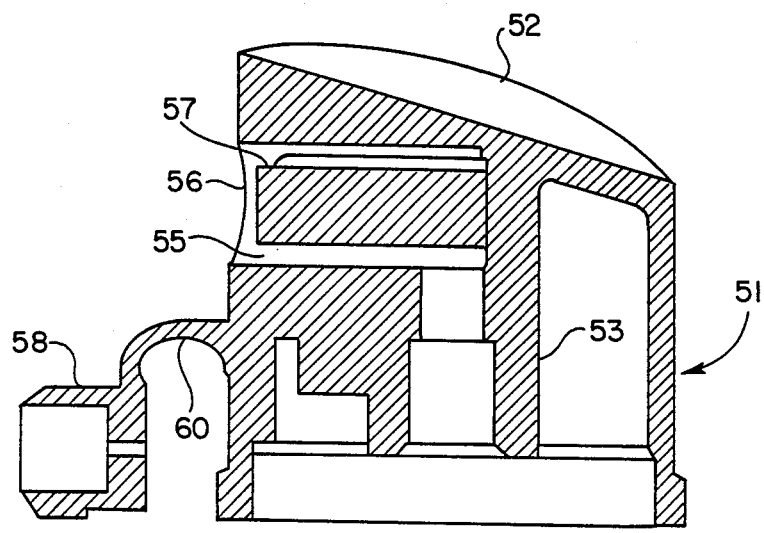
FIG. 4 is a cross-sectional view taken through a delivery head to be applied on the valve stem of an aerosol container.

FIG. 4 shows as an alternative a delivery head for aerosol containers or containers provided with pumping means, which head has been obtained following the teachings of the present invention. The delivery head generally designated by 51 has a slightly concave upper surface 52 for receiving a user finger and a body 53 provided with the vertical passage 54 communicating with the horizontal delivery passage 55 opening outwardly through an outlet opening 56 provided with an abutment surface 57 for receiving the break-up insert 58. The latter is integrally attached to the body 53 of the delivery head 51 through a thin strip 60 which is similar to the strip 10 of FIGS. 1,2 and 3 and accomplishes the same function so that, once the delivery head 51 has been stripped from the mold P, the break-up insert 58 will be correctly housed in the outlet opening 56 and applied on the abutment surface 57. Thereafter, the delivery head 51 is ready to be used.

From the foregoing, the great utility of the delivery head obtained in accordance with the present invention will be readily apparent, since it does not require any expensive machine for applying the break-up insert. Another great advantage resides in the fact that the proper break-up insert is associated to each delivery head and therefore there is not the need of providing sorting operations and possible other adjustment steps of the break-up insert.

While a preferred embodiment of the present invention has been illustrated and described in the foregoing, it should be understood that various changes and modifications can be made thereto by those skilled in the art without departing from the scope of the present invention as defined by the appended claims.

What I claim is:

1. A method of molding and assembling a delivery head, the head comprising an inverted cup-shaped cap having a central downward discharge conduit and connected lateral conduit under the top wall of the cap, the conduit terminating outwardly in a delivery outlet in the sidewall of the cap, and an insert having a central orifice and being adapted to fit in mating relation with the outlet, the shape of the outlet and the shape of the insert between them defining a breakup chamber, the insert being connected to the side wall of the cap at a point under the outlet by an attachment strip, the strip, the cap, and the insert being integrally molded, said method comprising the steps of:
    (a) molding the head in a mold in which the side of the cap on which the insert is disposed is formed by a laterally moving mold die, and a movable mold fence is disposed between the said mold die and the cap, the fence and the said mold die forming between them the attachment strip and the insert, the latter being molded in disposition extending downward from the point with the insert at its lower end,
    (b) opening the mold after molding,
    (c) slightly retracting the mold fence back a short distance away from the cap after molding,
    (d) stripping the head out of the mold in a downward direction so that the attachment strip engages the top of the fence and pivots about the point as the head is moved downward, the insert at the end of the pivoting being pressed by the fence into frictional engagement with the delivery outlet to complete the assembly.

2. A method as claimed in claim 1 wherein the said mold fence is an L-shaped element.

3. A method as claimed in claim 1 wherein the insert is cup-shaped and the delivery outlet is formed with an outward projection which receives the opening of the insert.

* * * * *